(12) United States Patent
Genkin et al.

(10) Patent No.: US 8,356,281 B2
(45) Date of Patent: *Jan. 15, 2013

(54) METHOD, SYSTEM AND PROGRAM PRODUCT FOR RECORDING AND REPLAYING TARGET SERVICE INTERACTION DATA

(75) Inventors: Mikhail B. Genkin, North York (CA); Michael Starkey, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/781,889

(22) Filed: May 18, 2010

(65) Prior Publication Data

US 2010/0293531 A1 Nov. 18, 2010

Related U.S. Application Data

(63) Continuation of application No. 10/933,107, filed on Sep. 2, 2004, now Pat. No. 7,752,604.

(51) Int. Cl.
*G06F 9/44* (2006.01)
*G06F 9/45* (2006.01)

(52) U.S. Cl. ............ 717/125; 717/127; 703/22

(58) Field of Classification Search .......... 717/125
See application file for complete search history.

(56) References Cited

U.S. PATENT DOCUMENTS

| 4,533,997 | A | * | 8/1985 | Furgerson | 703/21 |
|---|---|---|---|---|---|
| 4,825,358 | A | * | 4/1989 | Letwin | 713/1 |
| 5,027,273 | A | * | 6/1991 | Letwin | 713/600 |
| 5,220,658 | A | * | 6/1993 | Kerr et al. | 703/22 |
| 5,371,878 | A | * | 12/1994 | Coker | 703/28 |
| 5,561,788 | A | * | 10/1996 | Letwin | 703/22 |
| 5,684,945 | A | * | 11/1997 | Chen et al. | 714/20 |
| 5,748,499 | A | * | 5/1998 | Trueblood | 702/187 |
| 6,418,471 | B1 | * | 7/2002 | Shelton et al. | 709/227 |
| 6,631,345 | B1 | * | 10/2003 | Schumacher et al. | 703/22 |
| 6,985,940 | B1 | * | 1/2006 | Jenkin | 709/224 |
| 7,013,251 | B1 | * | 3/2006 | Nace et al. | 703/13 |

(Continued)

OTHER PUBLICATIONS

Huang et al., "An Integrated Approach to Real-time Environmental Simulation and Visualization", © 2004 ISEIS, retrieved from <http://www.iseis.org/jei/fulltext.asp?no=200400026> total pp. 9.*

*Primary Examiner* — Don Wong
*Assistant Examiner* — Marina Lee
(74) *Attorney, Agent, or Firm* — Steven M. Greenberg, Esq.; Carey, Rodriguez, Greenberg & O'Keefe (57) ABSTRACT

An architecture that allows target service interactions to be realistically simulated in a development environment. The architecture includes a proxy service, an interaction recorder, an interaction store and an emulator service. The proxy service delegates service requests received from a client component to a target service. If it is in "record" mode, the proxy service routes any interaction data corresponding to the interaction (between the target service and the client component) to the interaction recorder. Upon receipt, the interaction recorder records the interaction data in the interaction store. Later, the proxy service can be placed in "replay" mode so that a subsequent service request for the target service is delegated to the emulator service. Upon receipt, the emulator service retrieves the corresponding interaction data from the data store and replays the same to emulate/simulate the target service.

7 Claims, 5 Drawing Sheets

U.S. PATENT DOCUMENTS

| | | | |
|---|---|---|---|
| 7,139,978 B2 * | 11/2006 | Rojewski et al. | 715/744 |
| 7,209,874 B2 * | 4/2007 | Salmonsen | 703/23 |
| 7,236,165 B2 * | 6/2007 | Dautelle | 345/418 |
| 7,752,604 B2 * | 7/2010 | Genkin et al. | 717/125 |
| 2003/0115572 A1 * | 6/2003 | Zondervan et al. | 717/109 |
| 2003/0172198 A1 * | 9/2003 | Tiwary et al. | 710/1 |
| 2004/0039934 A1 * | 2/2004 | Land et al. | 713/200 |
| 2004/0088602 A1 * | 5/2004 | Cohen et al. | 714/38 |
| 2004/0243338 A1 * | 12/2004 | Sabiers et al. | 702/122 |
| 2005/0246153 A1 * | 11/2005 | Genkin et al. | 703/22 |
| 2006/0047496 A1 * | 3/2006 | Genkin et al. | 703/22 |
| 2010/0293531 A1 * | 11/2010 | Genkin et al. | 717/134 |

* cited by examiner

METHOD, SYSTEM AND PROGRAM PRODUCT FOR RECORDING AND REPLAYING TARGET SERVICE INTERACTION DATA

CROSS-REFERENCE TO RELATED APPLICATIONS

This application is a Continuation of U.S. application Ser. No. 10/933,107, filed Sep. 2, 2004, issued as U.S. Pat. No. 7,752,604 on Jul. 6, 2010, entitled "METHOD, SYSTEM AND PROGRAM PRODUCT FOR RECORDING AND REPLAYING TARGET SERVICE INTERACTION DATA," the entirety of which is incorporated herein by reference.

BACKGROUND OF THE INVENTION

1. Field of the Invention

In general, the present invention provides a method, system and program product for recording and replaying target service interaction data. Specifically, the present invention allows a service interaction to be realistically simulated in a development environment.

2. Related Art

As computing technology becomes more advanced, a key area of development has been in Business-to-Business and Enterprise Integration Applications. In service-oriented applications, middle tier components are represented by services and processes. Services often access remote resources, such as Enterprise Information Systems (EIS). Some typical examples of an EIS are CICS, IMS, SAP, PeopleSoft, etc.

In a service-oriented application, client components (e.g., JAVA Beans, Enterprise JAVA Beans, processes, etc. {JAVA, JAVA bean and Enterprise JAVA bean are trademarks of Sun Microsystems Corp. in the U.S. and/or elsewhere}) do not execute EIS transactions directly. Rather, each EIS transaction is typically executed by invoking an operation defined by a target "service" that is described by one or more Web Services Description Language (WSDL) files. These WSDL files capture the following information about the service: (1) port type, or interface describing the service operations, and the format of input and output data; (2) service bindings describing the address of the EIS system to connect to; and (3) operation bindings describing the name of the EIS function to execute, and additional system-specific information (e.g., protocol).

Service invocations are generally performed by a service invocation framework. Some examples of service invocation frameworks include International Business Machine Corp.'s Web Services Invocation Framework (WSIF) and JService container. The service invocation framework provides a level of indirection between the caller and the callee. The client component generally needs to be aware of the interface (port type) of the service, but not necessarily the binding used to invoke the service. To this extent, a typical service invocation using WSIF involves the following high-level steps: (1) client code registers the target service with WSIF-WSDL definition files are loaded; (2) WSIF looks up the required service provider based on the binding of the requested service; (3) WSIF uses the provider to create a dynamic port containing connection information; (4) client code uses the dynamic port to create input and output messages; (5) client code uses the dynamic port to create an operation instance; (6) client code prepares a message containing data that is used as input to the underlying transaction, and a message that is used to hold the results; (7) client code calls the execute( )method of the operation instance, passing the input message as argument; and (8) client code processes the message that holds the transaction results.

Unfortunately, one of the key problems encountered during development of Business-to-Business and Enterprise Integration Applications involves unit testing and debugging of middle-tier components. Specifically, the EIS running production transactions should not be interfered with during the development process, otherwise side effects from interactions during the development process are captured in the production system. The same logic applies to other types of resources accessed by a given service such as a remote EJB. During the lifecycle of a service-oriented application, it will go through the following phases: (1) initial creation; (2) unit testing; (3) integration testing; (4) certification testing; (5) deployment to production environment; (6) monitoring and problem/determination in the production environment; and (7) iterative development to fix problems, and subsequent re-deployment.

During phases 6 and 7, to perform problem determination and iterative fixes, developers need to work in an environment that very closely resembles the production environment. Setting up duplicate EIS's with a replicated subset of production data is frequently a very difficult, time-consuming, and expensive process. It involves setting up duplicate hardware and software, and placing additional workload on key technical staff. In addition, it is very difficult to test and demo new applications in a field environment because the required EIS environment is not portable. Conventional logging often does not provide sufficient information to precisely identify the problem, and it can be impossible to validate the fix without re-deployment.

In view of the foregoing, there exists a need for production phase EIS and Service interactions to be recorded in such a way that they can be replayed during future development phases. Specifically, a need exists for a system in which realistic service interactions can be simulated during application development. To this extent, there is a need to be able to simulate interactions using actual production data as opposed to sample data.

SUMMARY OF THE INVENTION

In general, the present invention provides a method, system and program product for recording and replaying service interaction data. Specifically, the present invention provides a system/architecture that allows a target service to be realistically simulated in a development environment. In general, the system of the present invention includes a proxy service, an interaction recorder, an interaction store and an emulator service. The proxy service delegates service requests received from a client component to a target service, the interaction recorder or the emulator service depending on its mode setting. For example, if the proxy service is in "normal" mode, it will simply allow communications to flow between the client component and the target service. Conversely, if the proxy service is in "record" mode, it will route any interaction data corresponding to the interaction (between the target service and the client component) to the interaction recorder as well as to the client component. Upon receipt, the interaction recorder records the interaction data in the interaction store. Later, during the development phase of an application, the proxy service can be placed in "emulate" mode. During "emulate" mode, a subsequent service request for the target service is delegated to the emulator service instead of to the target service. Upon receipt, the emulator service retrieves the corresponding interaction data from the data store and replays the same to emulate/simulate the target service.

A first aspect of the present invention provides a method for recording and replaying target service interaction data, comprising: receiving a service request on a proxy service from a client component; delegating the service request from the proxy service to a target service; receiving interaction data on the proxy service from the target service, wherein the interaction data corresponds to an interaction between the client component and the target service pursuant to the service request; and recording the interaction data in an interaction store.

A second aspect of the present invention provides a system for recording and replaying target service interaction data, comprising: a proxy service for delegating a service request received from a client component to a target service, and for receiving interaction data from the target service corresponding to an interaction between the client component and the target service pursuant to the service request; and an interaction recorder for receiving the interaction data from the proxy service, and for recording the interaction data in an interaction store.

A third aspect of the present invention provides a program product stored on a recordable medium for recording and replaying target service interaction data, which when executed, comprises: a first program module for delegating a service request received from a client component to a target service, and for receiving interaction data from the target service corresponding to an interaction between the client component and the target service pursuant to the service request; and a second program module for receiving the interaction data from the proxy service, and for recording the interaction data in an interaction store.

A fourth aspect of the present invention provides a system for deploying an application for recording and replaying target service interaction data, comprising: a computer infrastructure being operable to: receive a service request on a proxy service from a client component; delegate the service request from the proxy service to a target service; receive interaction data on the proxy service from the target service, wherein the interaction data corresponds to an interaction between the client component and the target service pursuant to the service request; and record the interaction data in an interaction store.

A fifth aspect of the present invention provides computer software embodied in a propagated signal for recording and replaying target service interaction data, the computer software comprising instructions to cause a computer system to perform the following functions: receive a service request on a proxy service from a client component; delegate the service request from the proxy service to a target service; receive interaction data on the proxy service from the target service, wherein the interaction data corresponds to an interaction between the client component and the target service pursuant to the service request; and record the interaction data in an interaction store.

A sixth aspect of the present invention provides a method for creating components for recording and replaying target service interaction data: providing a target service definition corresponding to a target service; providing an emulator model for emulating the target service; and creating a proxy service, an interaction store and an emulator service using the target service definition and the emulator model.

A seventh aspect of the present invention provides a generator for creating components for recording and replaying target service interaction data, comprising: an information access system for accessing a target service definition corresponding to a target service and an emulator model for emulating the target service; and a component creation system for creating a proxy service, an interaction store and an emulator service using the target service definition and the emulator model.

Therefore, the present invention provides a method, system and program product for recording and replaying service interaction data.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes, the Detailed Description of the Drawings will have the following sections:
I. General Description
II. Computerized Implementation
I. General Description As indicated above, the present invention provides a method, system and program product for recording and replaying service interaction data. Specifically, the present invention provides a system/architecture that allows a target service to be realistically simulated in a development environment. In general, the system of the present invention includes a proxy service, an interaction recorder, an interaction store and an emulator service. The proxy service delegates service requests received from a client component to a target service, the interaction recorder or the emulator service depending on its mode setting. For example, if the proxy service is in "normal" mode, it simply allows communications to flow between the client component and the target service. Conversely, if the proxy service is in "record" mode, it routes any interaction data corresponding to the interaction (between the target service and the client component) to the interaction recorder as well as to the client component. Upon receipt, the interaction recorder records the interaction data in the interaction store. Later, during the development phase of an application, the proxy service can be placed in "emulate" mode. During "emulate" mode, a subsequent service request for the target service is delegated to the emulator service instead of to the target service. Upon receipt, the emulator service retrieves the corresponding interaction data from the data store and replays the same to emulate/simulate the target service.

Figure 1:
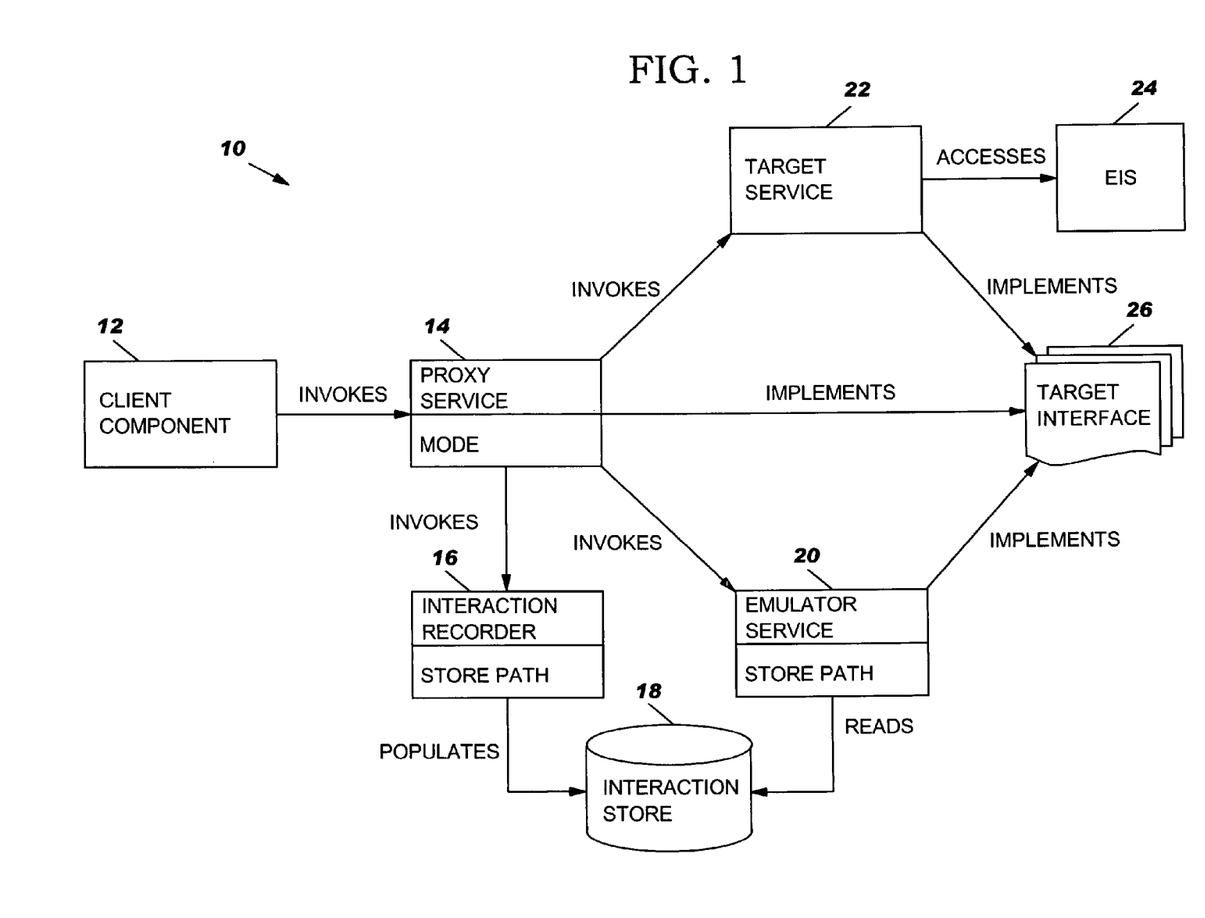
FIG. 1 depicts a system/architecture for recording and replaying target service interaction data according to the present invention.

Referring now to FIG. 1 a system/architecture (hereinafter system 10) for recording and replaying target service interaction data according to the present invention is shown. In general, the components of system 10 that are provided under the present invention include proxy service 14, interaction recorder 16, interaction store 18 and emulator service 20. As will be further described below, these components allow for interaction data between client component 12 and target service 22 to be recorded during the production phase of an application, and later replayed during the development phase of an application. The interaction data is typically generated pursuant to a request issued by client component 12 for target service 22.

To this extent, it should be understood that target service 22 is intended to represent an actual service running in the production environment. As indicated above, target service 22 can be described by one or more Web Services Description Language (WSDL) files, which capture various pieces of information about the service. Target service 22 can interface with another component such as EIS 24 (as shown), a web service, etc. Client component 12 can be any type of client component now known or later developed. For example, client component 12 could be a JAVA Bean, an Enterprise JAVA Bean, a process, etc.

In any event, proxy service 14 is a service that "wrappers" the target service 22 and routes requests from client component 12. Under the present invention, proxy service 14 is typically provided with at least three modes, namely, "normal," "record," and "emulate." The "normal" and "record" modes of proxy service 12 are typically production phase modes. During "normal" mode, proxy service 14 simply delegates/routes communications between client component 12 and target service 22 (i.e., proxy service 14 invokes target service 22). During "record" mode, proxy service 14 also monitors the characteristics of service interactions (i.e., interaction data) between client component 12 and target service 22. In addition to being routed to the client component 12, the interaction data is also routed to interaction recorder 16 (i.e., proxy service 14 invokes interaction recorder 16), which examines and serializes it into a format that can be used by the emulator service 20. Once formatted in this manner, interaction recorder 16 records the interaction data in interaction store 18, which can be implemented using a variety of formats (e.g., XML file, RDBMS storing XML data).

During the development phase of an application, proxy service 14 can be placed in "emulate" mode to realistically simulate interaction with target service 22. Specifically, when proxy service 14 is placed in "emulate" mode, any requests it receives from client component 12 is delegated to emulator service 20 as opposed to target service 22 (i.e., proxy service 14 invokes emulator service 20 as opposed to target service 22). Emulator service 20 accesses and replays the previously recorded interaction data in interaction store 18 to emulate/simulate target service 22. As further shown in FIG. 1, proxy service 14, emulator service 20 and target service 22 all implement a common target interface 26. This is so that all interactions with these services 14, 20 and 22 can appear and take place as if they were occurring with target service 22 directly.

Figure 2:
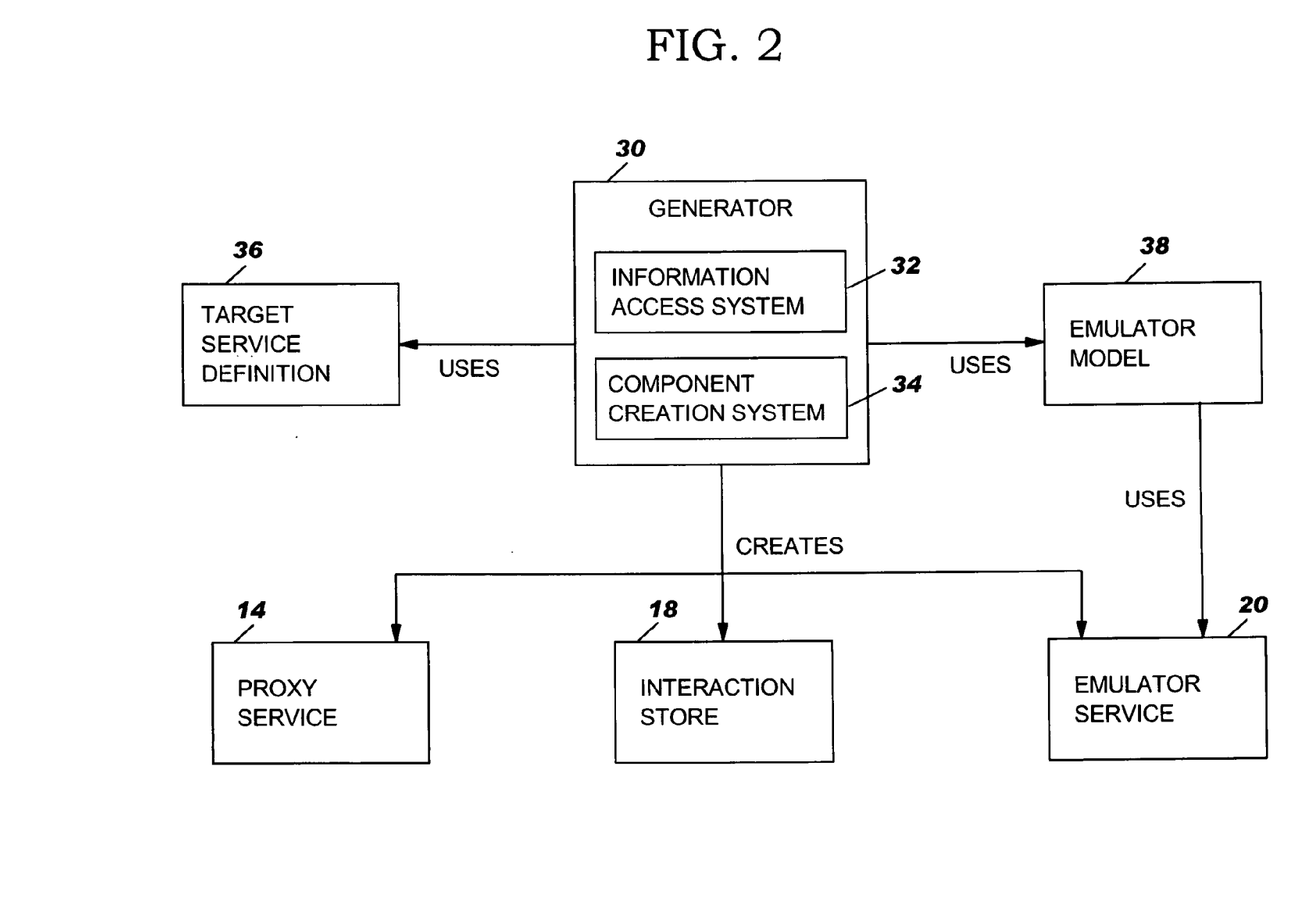
FIG. 2 depicts a generator for creating the proxy service, the interaction store and the emulator service of FIG. 1.

In any event, to make the emulation of target service 22 more realistic, the present invention provides a generator that initially creates proxy service 14, interaction store 18 and emulator service 20 based on specific characteristics of target service 22. Referring now to FIG. 2, the creation of proxy service 14, interaction store 18 and emulator service 20 will be shown and described in greater detail. As depicted, generator 30 includes information access system 32 and component creation system 34. In a typical embodiment, generator 30 is a factory class that uses information from the target service definition 36 and the emulator model 38 to create the proxy service 14, interaction store 18 and/or emulator service 20.

To this extent, information access system 32 will access/obtain target service definition 36 and emulator model 38 to create proxy service 14, emulator service 20 as well as the schema of interaction store 18. Target service definition 36 (e.g., a WSDL definition) contains data describing target service 22 (FIG. 1) such as, among other things: (1) a target service name; (2) a level of transactional support; (3) a number of allowed concurrent connections; (4) the allowed users; (5) operation names visible to each user; (6) interactions possible for each operation—input/output data, faults, execution time for each. In addition, current WSDL implementations provide descriptions of: (1) an interface name (Port Type); (2) operation names; and (3) schemata for input and output data and faults. Emulator model 38 provides a precise model or description of how emulator service 20 should be created using target service definition 36. Although not shown in FIG. 2, it should be understood that other specifications such as WS-Policy, QoS aspects can also be captured by information access system 32. In the absence of these specifications this information could be parsed out from EJB deployment descriptors and EAR files. In situations where these are not used, it may need to be entered in manually—via user prompts presented by the information access system 32.

Once target service definition 36 and emulator model 38 are obtained, component creation system 34 utilizes this information and any other specifications to create proxy service 14, interaction store 18 and emulator service 20. In performing this task(s), component creation system 34 can also partially populate interaction store 18. Specifically, at tool time the component creation system 34 can create interaction store 18's (e.g., XML file or RDBMS tables) schema using emulator model 38 and port type and QoS information extracted from target service definition 36. At such a point, interaction store 18 would then contain: (1) a definition for the emulated target service 22 (FIG. 1) or EIS 24 (FIG. 1), including transaction support level; (2) definitions for allowed connections, including credential information necessary to establish the connection; and (3) definitions for allowed operations (functions) visible to each connection. Thereafter, interaction store 18 is ready to receive interaction data captured at runtime.

Referring back to FIG. 1, the "record" and "emulate" modes of proxy service 14 will be described in greater detail. As mentioned above, the "record" mode of proxy service 14 allows interaction data corresponding to an interaction between client component 12 and target service 22 to be recorded. The interaction typically corresponds to some type of request issued by client component 12 for target service. Moreover, the interaction data typically includes data such as: (1) invocation semantics for the interaction (synchronous request response, asynchronous one-way, etc.); (2) input data for the interaction; (3) output data for the interaction; (5) a transaction context of the interaction (e.g., within which the interaction took place); (6) a security context of the interaction (e.g., the identity that was used to perform the invocation); (7) actual fault data raised by the interaction, if any; and/or (8) the time it took for the interaction to complete;

In an illustrative example, assume that a request for a stock quote is issued by client component 12. Under the present invention, client component 12 invokes proxy service 14, which invokes target service 22 and delegates the request thereto. Target service 22 processes the request and returns transaction data to proxy service 14. If proxy service 14 is in "normal" mode, the transaction data is only routed back to client component 12. However, when in "record" mode, proxy service 14 both routes the interaction data to client component 12, and invokes interaction recorder 16 and routes the interaction data thereto. Upon receipt, interaction recorder 16 formats and serializes the interaction data so that it will later be useable by emulator service 20. Then, interaction recorder 16 populates interaction store 18 by recording the interaction data at a particular storage path. It should be understood that the recording of interaction data under the present invention will not interfere with the interaction between client component 12 and target service 22. Rather, a copy of the interaction data flowing between client component 12 and target service 22 (e.g., input "request," output "response," Quality of Service metrics, performance metrics, etc.) is made for recording in interaction store 18.

Figure 3:
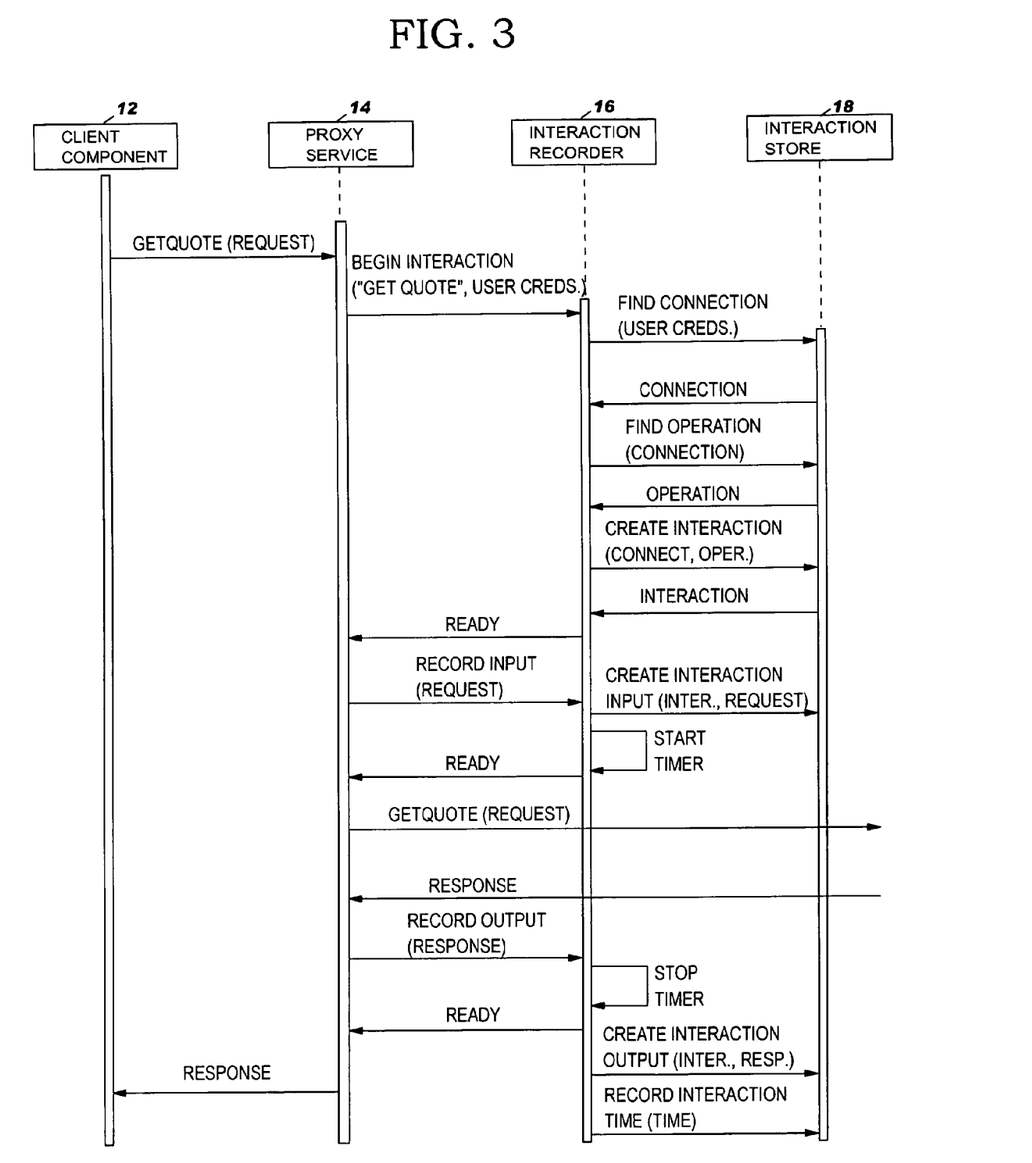
FIG. 3 depicts a first flow diagram according to the present invention.

Under the present invention, a series of calls are made between proxy service 14, interaction recorder 16, and interaction store 18 to properly record the interaction data so that it can be accurately retrieved by emulator service 20. Referring to FIG. 3, these calls are shown in greater detail. As depicted, when proxy service 14 (in "record" mode) first receives the request from client component 12, it makes an initial call to interaction recorder 16 (i.e., in addition to invoking target service 22) to begin an interaction. Thereafter, interaction recorder 16 attempts to find a connection (e.g., based on user credentials) to interaction store 18. Once the connection is obtained, interaction recorder 16 attempts to find an operation for the request (e.g., get stock quote) in interaction store 18. Once the operation is found, interaction recorder 16 creates an interaction (e.g., based on the connection and operation) in interaction store 18. Thereafter, interaction recorder 16 communicates a "ready" message to proxy service 14, which returns a request to record the forthcoming input (request) data. Based on the request, interaction recorder 16 submits a request to interaction store 18 to create the interaction input (e.g., based on the interaction and the initial request). At that point, a timer is started and the get quote request is delegated to and processed by target service 22 (FIG. 1). When the output (response) interaction data is received back from target service 22, proxy service 14 issues a call to interaction recorder 16 to record the interaction data and the timer will be stopped. Once proxy service 14 receives another "ready" message from interaction recorder 16, it forwards the data to client component 12, and interaction recorder 16 records the interaction data (e.g., interaction output) and interaction time as set forth by the timer in interaction store 18. At that point, the interaction data is stored within interaction store 18 based on the connection, operation, the interaction, the interaction response and the interaction time.

Referring back to FIG. 1, once the interaction data has been stored in this manner, it can later be used during a development phase of an application to emulate target service 22. Specifically, assume that a subsequent application is under development that also obtains stock quotes from target service 22. In that case, proxy service 14 can be set to "emulate" mode. Then, any subsequent request received from client component 12 is routed/delegated to emulator service 20 as opposed to target service 22. After this retrieval, emulator service 20, using a series of calls, retrieves the interaction, data previously recorded for the stock quote request to target service 22 that was recorded in interaction store 18. Emulator service 20 replays the interaction data to emulate/simulate target service 22. Because actual interaction data is being used, and because emulator service 20 is created based on the target service definition and an appropriate emulator model, emulator service 20 is able to emulate target service 22 in a realistic manner. Thus, an interaction with target service 22 can be realistically simulated without actually interfering with the production level operations thereof.

Figure 4:
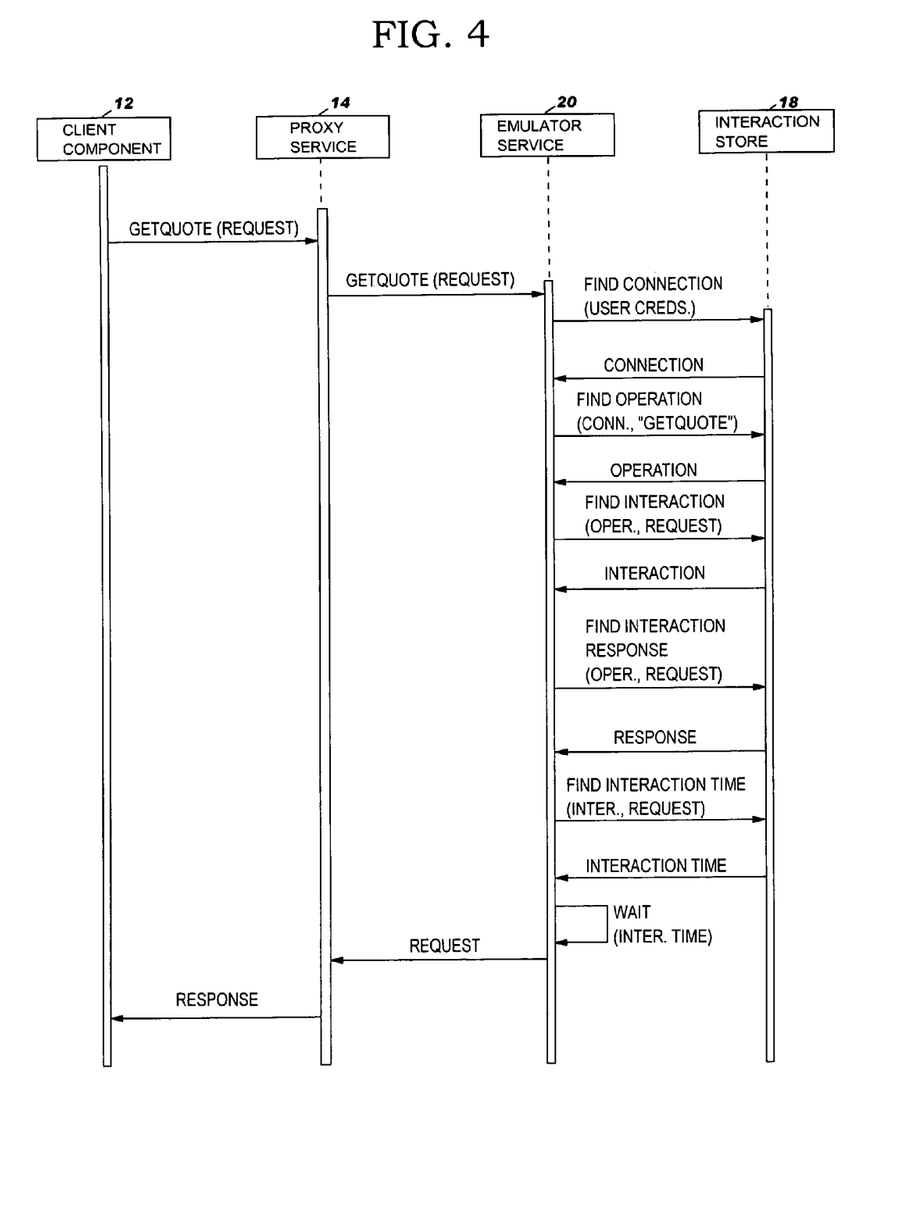
FIG. 4 depicts a second flow diagram according to the present invention.

As indicated above, the retrieval of the interaction data from interaction store 18 involves a series of calls between emulator service 20 and interaction store 18. Referring to FIG. 4, those calls are shown in greater detail. As depicted, when proxy service 14 initially receives the get stock quote request from client component 12, it delegates the request to emulator service 20. After receiving the request, emulator service 20 first attempts to find the appropriate connection with interaction store 18. Once found, emulator service 20 attempts to find the appropriate operation in interaction store 18. After finding this operation, emulator service 20 attempts to find the appropriate interaction. Thereafter, emulator service 20 attempts to find the appropriate interaction response. Once the interaction response is found, emulator service 20 attempts to find the appropriate interaction time. After these calls are successfully made, emulator service 20 has located the correct interaction data (i.e., the response), which is forwarded back to proxy service 14 and on to client component 12.

Figure 5:
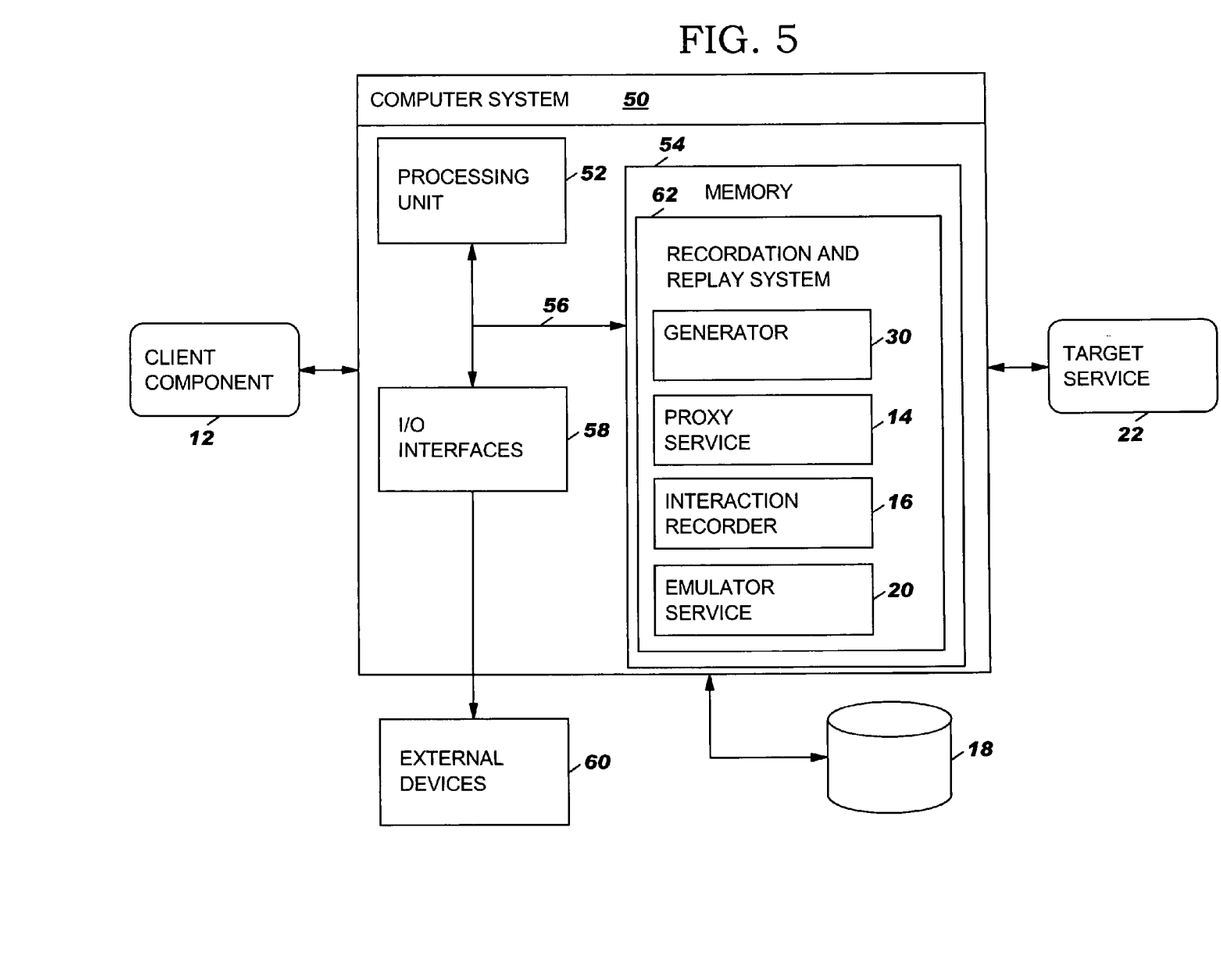
FIG. 5 depicts a more specific computerized implementation of the system/architecture of FIG. 1.

As further described below in conjunction with FIG. 5 some of the components of the present invention can be implemented during different phases of the application. For example, since interaction recorder 16 records actual interaction data during the production phase of an application, interaction recorder 16 need only be implemented in the production environment. Conversely, since emulator service is used during the development phase of an application to emulate target service 22, emulator service 20 need only be implemented in the development environment.

II. Computerized Implementation

In a typical embodiment, the present invention is realized in a computerized environment. Referring to FIG. 5, a more detailed diagram of a computerized implementation of the present invention is shown. As depicted, the components of the present invention are realized on computer system 50 as one or more program products. Computer system 50 is intended to represent any type of computerized system capable of carrying out the teachings of the present invention. For example, computer system 50 could be a desktop computer, laptop computer, a workstation, a handheld device, a server, etc.

In general, communication between computer system 50, client component 12 and target service 22 can communicate directly, or over a network such as the Internet, a local area network (LAN), a wide area network (WAN), a virtual private network (VPN), etc. In the case of the latter, a direct hard-wired connection (e.g., serial port), or an addressable connection can be implemented. The addressable connection may utilize any combination of wire line and/or wireless transmission methods. Moreover, conventional network connectivity, such as Token Ring, Ethernet, WiFi or other conventional communications standards can be used. Still yet, connectivity can be provided by conventional IP-based protocol.

As also depicted, computer system 50 generally comprises processing unit 52, memory 54, bus 56, input/output (I/O) interfaces 58, external devices/resources 60 and interaction store 18. Processing unit 52 may comprise a single processing unit, or be distributed across one or more processing units in one or more locations, e.g., on a client and server. Memory 54 may comprise any known type of data storage and/or transmission media, including magnetic media, optical media, random access memory (RAM), read-only memory (ROM), a data cache, a data etc. Moreover, similar to processing unit 52, memory 54 may reside at a single physical location, comprising one or more types of data storage, or be distributed across a plurality of physical systems in various forms.

I/O interfaces 58 may comprise any system for exchanging information to/from an external source. External devices/resources 60 may comprise any known type of external device, including speakers, a CRT, LED screen, hand-held device, keyboard, mouse, voice recognition system, speech output system, printer, monitor/display, facsimile, pager, etc. Bus 56 provides a communication link between each of the components in computer system 50 and likewise may comprise any known type of transmission link, including electrical, optical, wireless, etc.

Interaction store 18 is typically, a persistent storage unit that can be any system (e.g., a database, etc.) capable of providing storage for information under the present invention. Such information can include, among other things, interaction data, target service definitions, emulator models, etc. As such, interaction store 18 can include one or more storage devices, such as a magnetic disk drive or an optical disk drive. In another embodiment, interaction store 18 includes data distributed across, for example, a local area network (LAN), wide area network (WAN) or a storage area network (SAN) (not shown).

Although not shown, additional components, such as cache memory, communication systems, system software, etc., may be incorporated into computer system 50. Moreover, it should be understood that any client computer on which client component 12 resides will likely include computerized components similar to computer system 50. It should also be appreciated that although not shown as such, client components and/or target service 22 can also reside on computer system 50. Further, although not shown in FIG. 5, target service 22 can communicate with an EIS, web service, etc.

In any event, shown in memory 54 as a program product is recordation and replay system 62, which includes the functional components of the present invention as described above. Specifically, as depicted, recordation and replay system 62 includes generator 30, proxy service 14, interaction recorder 16 and emulator service 20. As described above, generator 30 obtains target service definitions and an emulator model and uses this information (along with other specifications) to create proxy service 14, interaction recorder 16 and emulator service 20. Once created, these components can be used to record and replay interaction data corresponding to an interaction between client component 12 and target service 22. As mentioned above, it should be understood that since emulator service 20 is typically used during the development phase of an application, emulator service 20 need only be implemented in the development environment (as opposed to the production environment). Moreover, since interaction data is recorded during the production phase of an application, interaction recorder 16 need only be implemented in the production environment (as opposed the development environment).

As further described above, proxy service 14 has at least three modes under the present invention. During "normal" mode, communications are routed between client component 12 and target service 22. When proxy service 14 is placed in "record" mode, the response received from target service 22 is forwarded to both client component 12 and interaction recorder 16 for recording in interaction store 18. When replay is later desired such as during the development phase of an application, proxy service 14 can be placed in "emulate" mode. At that point, any requests received from client component 12 are delegated to emulator service 20 as opposed to target service 22. Emulator service 20 then accesses interaction store 18 and retrieves the previously recorded interaction data, which will be replayed to emulate target service 22. This provides a realistic simulation of the previous interaction between client component 12 and target service 22 without interfering with the production level operation of target service 22.

It should be appreciated that the teachings of the present invention can be offered as a business method on a subscription or fee basis. For example, system 10 of FIG. 1, generator 30 of FIG. 2, and/or computer system 50 of FIG. 5 can be created, maintained, supported and/or deployed by a service provider that offers the functions described herein for customers. That is, a service provider can offer to record and replay target service interaction data as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software can be a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of generator 30 of FIG. 2 and recordation and replay system 62 of FIG. 5 is intended to be illustrative only.

We claim:

1. A computer program product comprising a computer storage medium embodying computer usable program code for simulating a target service in a development environment, the computer program product comprising:
   computer usable program code for receiving a service request for a target service in a proxy service executing in memory by a processor of a computer;
   computer usable program code for determining whether a mode for the proxy service is selected to be either a normal mode, a record mode or an emulate mode;
   computer usable program code for delegating the service request to the target service through the proxy service if in the normal mode, to a recorder service wrapping the target service and configured to record interactions with the target service if in the record mode, and
   computer usable program code for retrieving the corresponding interaction data from interaction store and replaying the recorded interactions with the target service previously recorded while in the record mode, and
computer usable program code for emulating the functionality of the target service in emulator service instead of delegating the service request to the target service.

2. The computer program product of claim 1, wherein the computer usable program code for delegating the service request to the emulator service in lieu of the target service if in the emulate mode further comprises computer usable program code for emulating the functionality of the target service in the emulator service by playing back recorded interactions with the target service previously recorded while in the record mode.

3. The computer program product of claim 1, wherein the proxy service, the target service and the emulator service each implement a common target interface.

4. The computer program product of claim 1, wherein the recorded interactions comprise invocation semantics of an interaction with the target service, input data for the interaction, output data for the interaction, a time taken to complete the interaction, a transaction context of the interaction, and a security context of the interaction.

5. A system for simulating a target service in a development environment, the system comprising:
a computer with at least one processor and memory; and
a proxy service executing in the memory of the computer by the processor of the computer, the proxy service when executing in the memory of the computer, receiving a service request for a target service, determining whether a mode for the proxy service is selected to be either a normal mode, a record mode or an emulate mode, delegating the service request to the target service if in the normal mode, to a recorder service wrapping the target service and configured to record interactions with the target service if in the record mode, retrieving the corresponding interaction data from interaction store and replaying the recorded interactions with the target service previously recorded while in the record mode, and emulating the functionality of the target service in emulator service instead of delegating the service request to the target service.

6. The system of claim 5, where the target service and the emulator service each implement a common target interface.

7. The system of claim 5, where the recorded interactions comprise invocation semantics of an interaction with the target service, input data for the interaction, output data for the interaction, a time taken to complete the interaction, a transaction context of the interaction, and a security context of the interaction.

* * * * *